US011731689B2

United States Patent
Koenig et al.

(10) Patent No.: US 11,731,689 B2
(45) Date of Patent: Aug. 22, 2023

(54) METHOD AND SYSTEM FOR CONTROLLING ELECTRO HYDRAULIC POWER STEERING PUMP FOR POWER STEERING SYSTEM OF AN ELECTRIC VEHICLE

(71) Applicant: Robert Bosch GmbH, Stuttgart (DE)

(72) Inventors: Alexander Koenig, Northville, MI (US); Markus Rief, Plymouth, MI (US); Markus Wolf, Drösiedl (AT)

(73) Assignee: Robert Bosch GmbH, Stuttgart (DE)

( * ) Notice: Subject to any disclaimer, the term of this patent is extended or adjusted under 35 U.S.C. 154(b) by 499 days.

(21) Appl. No.: 17/028,458

(22) Filed: Sep. 22, 2020

(65) Prior Publication Data

US 2022/0089215 A1 Mar. 24, 2022

(51) Int. Cl.
*B62D 5/06* (2006.01)
*B60R 16/023* (2006.01)
*B62D 31/02* (2006.01)
*B60K 1/04* (2019.01)
*B62D 6/04* (2006.01)

(52) U.S. Cl.
CPC ............ *B62D 5/064* (2013.01); *B60K 1/04* (2013.01); *B60R 16/0231* (2013.01); *B62D 6/04* (2013.01); *B62D 31/02* (2013.01)

(58) Field of Classification Search
CPC .................................................. B62D 5/064
See application file for complete search history.

(56) References Cited

U.S. PATENT DOCUMENTS

| | | | |
|---|---|---|---|
| 6,725,963 B2 | 4/2004 | Gaunt et al. | |
| 7,164,978 B2 | 1/2007 | Takaki et al. | |
| 8,151,564 B2 | 4/2012 | Miller | |
| 8,983,731 B2 | 3/2015 | Chauvelier | |
| 10,518,802 B2 | 12/2019 | Wang et al. | |
| 10,668,926 B2* | 6/2020 | Birnschein | B60S 9/02 |
| 2013/0233638 A1 | 9/2013 | Lee | |
| 2022/0089215 A1* | 3/2022 | Koenig | B60K 1/04 |

* cited by examiner

*Primary Examiner* — Michael A Berns
(74) *Attorney, Agent, or Firm* — Michael Best & Friedrich LLP

(57) ABSTRACT

A system and method control an electro hydraulic power steering system for an electric vehicle having an electric vehicle battery. The power steering system includes an electro hydraulic power steering pump for assisting in movement of a steering wheel. An electronic controller includes an electronic processor configured to: receive a closed or open position for battery contactors from a contactor controller; receive a driving direction signal for the electric vehicle from a driving direction indicator; determine when the battery contactors are closed and when the driving direction signal is in drive or reverse for moving the electric vehicle, and provide an activation signal to operate the power steering pump when the battery contactors are closed and the driving direction signal is in one of drive and reverse. The electronic processor is configured to provide a deactivation signal to the power steering pump when the electric vehicle is not in drive or reverse; and/or the battery contactors are open.

20 Claims, 5 Drawing Sheets

METHOD AND SYSTEM FOR CONTROLLING ELECTRO HYDRAULIC POWER STEERING PUMP FOR POWER STEERING SYSTEM OF AN ELECTRIC VEHICLE

FIELD

This arrangement relates to a system and method for providing power steering to an electric vehicle, such as a truck or bus.

SUMMARY

One embodiment is directed to an electro hydraulic power steering system for an electric vehicle having an electric vehicle battery. The electro hydraulic power steering system comprises an electro hydraulic power steering pump for assisting in movement of a steering wheel; and a communication bus connected to a vehicle electronic controller, the vehicle electronic controller including an electronic processor and a memory. The electronic processor is configured to: receive a closed or open position for battery contactors from a contactor controller over the communication bus, receive a driving direction signal for the electric vehicle from a driving direction indicator over the communication bus, determine when the battery contactors are closed and when the driving direction signal is drive or reverse for the electric vehicle, provide an activation signal to operate the electro hydraulic power steering pump when the battery contactors are closed and the driving direction signal is for one of drive and reverse, wherein a vehicle user is capable of changing a direction of steered wheels of the electric vehicle, determine when the electric vehicle is not in drive or reverse, determine whether the battery contactors are open; and provide a deactivation signal to the electro hydraulic power steering pump of the electric vehicle when the electric vehicle is not in either of drive and reverse, and/or when the battery contactors are open.

Another embodiment is a method for controlling an electro hydraulic power steering pump of an electro hydraulic power steering system of an electric vehicle including an electronic processor. The method includes: determining closing of battery contactors, providing a driving direction signal with a driving direction indicator indicating when the electric vehicle is in drive or reverse, activating an electro hydraulic power steering pump for the electro hydraulic power steering system whereby a vehicle user is capable of changing a direction of steered wheels of the electric vehicle when the battery contactors are closed and the electric vehicle is in drive or reverse; determining when the electric vehicle is not in one of drive and reverse, or that the battery contactors are open with the electronic processor, and deactivating the electro hydraulic power steering pump when the electric vehicle is not in either of reverse or drive, and/or when the battery contactors are open.

Another embodiment is directed to an electric vehicle comprising: an electric vehicle battery; contactors provided between the electric vehicle battery and an electro hydraulic power steering pump; a driving direction indicator for providing signals for a shift position of a driving selector; an electro hydraulic power steering pump for assisting in movement of a steering wheel; and a communication bus connected to a vehicle electronic controller, the vehicle electronic controller including an electronic processor and a memory. The electronic processor is configured to: receive a closed or open position for battery contactors from a contactor controller over the communication bus; receive a driving direction signal for the electric vehicle from the driving direction indicator over the communication bus; determine when the battery contactors are closed and when the driving direction signal is drive or reverse for the electric vehicle; provide an activation signal to operate the electro hydraulic power steering pump when the battery contactors are closed and the driving direction signal is for one of drive and reverse, wherein a vehicle user is capable of changing a direction of steered wheels of the electric vehicle; determine when the electric vehicle is not in drive or reverse; determine whether the battery contactors are open; and provide a deactivation signal to the electro hydraulic power steering pump of the electric vehicle when the electric vehicle is not in either of drive and reverse, and/or when the battery contactors are open.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "electronic processors," "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components.

Figure 1:
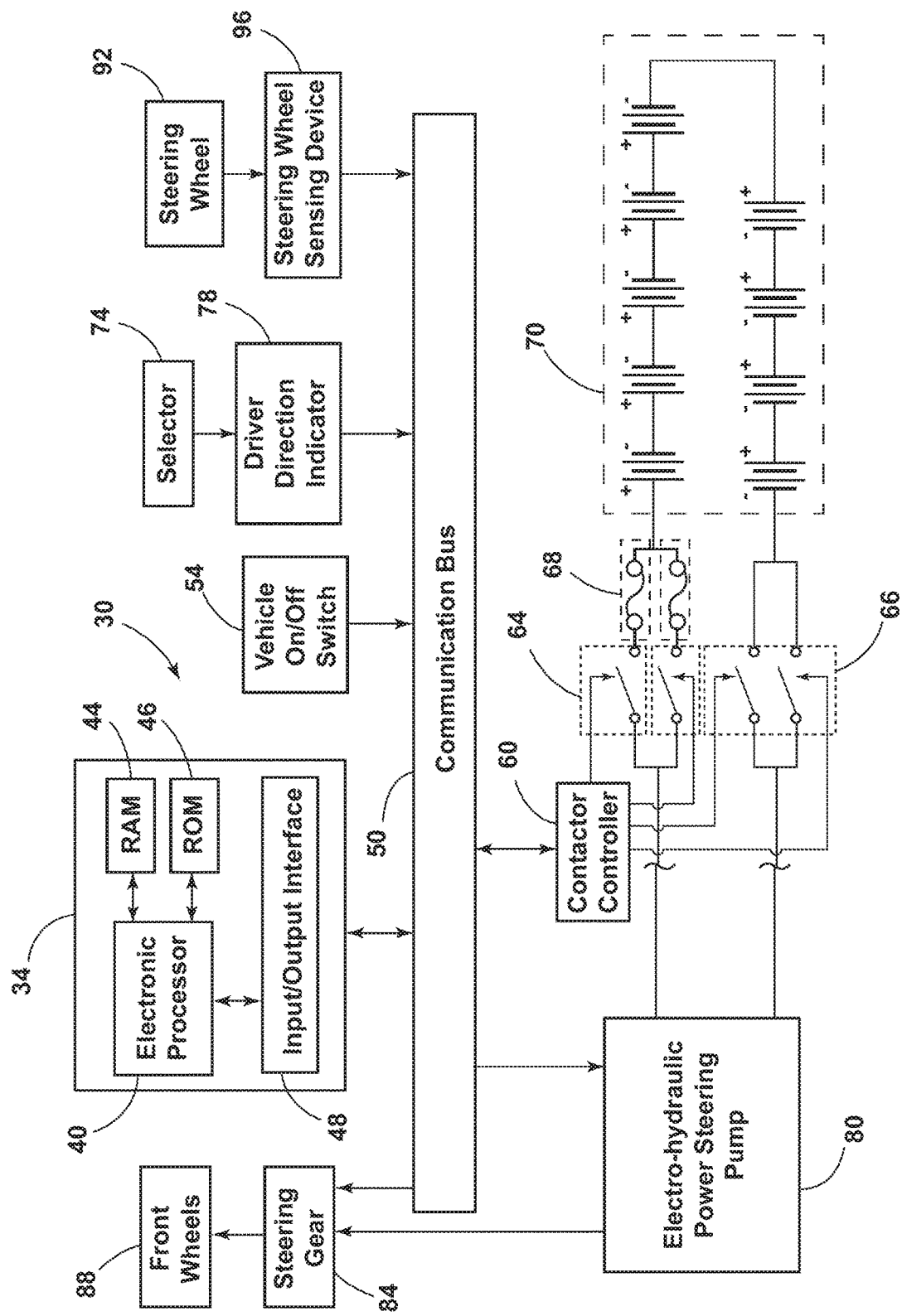
FIG. 1 illustrates a block diagram of one embodiment of an electro hydraulic power steering system for an electric vehicle.

FIG. 1 shows a block diagram view of an electro hydraulic power steering system 30 for controlling operation of an electro hydraulic power steering pump of an electric vehicle.

In one embodiment, the electro hydraulic power steering system 30 includes a vehicle electronic controller 34. The vehicle electronic controller 34 includes an electronic processor 40 and a memory. The memory includes one or more memory modules, such as a random access memory ("RAM") 44 and/or an electronically erasable programmable read-only memory ("EEPROM") 46. An input/output interface 48 transmits and receives information over a communication bus 50. The electronic processor 40 processes the information by executing one or more applications or modules. The applications or modules can be stored as instructions or commands in the memory 44, 46. The electronic processor 40 also stores information in the memory 44 generated by applications. The vehicle electronic controller 34 controls the electro hydraulic power steering system 30, the vehicle traction control system, and other vehicle systems in one embodiment.

The communication bus 50 shown in FIG. 1 is a FlexRay automotive communication bus, controller area network (CAN) bus or other type of communication link between a plurality of controllers, sensors, and other devices. In the FIG. 1 embodiment, the communication bus 50 connects a vehicle on/off switch 54 to a contactor controller 60 having high voltage (HV) battery contactors 64, 66 and fuses 68. The battery contactors 64, 66 and fuses 68 connect with a high voltage (HV) electric vehicle battery 70 for driving an electric vehicle. The traction control system of the electric vehicle is not illustrated in FIG. 1. The contactor controller 60 operates for closing or opening of the HV battery contactors 64, 66 depending on a start signal over the communication bus 50 from the vehicle on/off switch 54. The vehicle on/off switch 54 can be a push button switch, a key actuated switch, a touchscreen activated switch, or other input device.

FIG. 1 shows a driving selector 74 for selecting forward drive (D), reverse (R), neutral (N) or park (P) for the electric vehicle. The driving selector 74 can be provided by a lever, inputs to a touchscreen, a selector with a push button to allow pivoting or other movement thereof, or other selector input arrangements. The driving selector 74 interacts with a driving direction indicator 78 to provide signals indicating a shift position of the driving selector 74 onto the communication bus 50. More specifically, the driving direction indicator 78 determines shifting to one of park, neutral, drive, and reverse and provides a driving direction signal. The communication bus 50 provides the driving direction signal to the vehicle electronic controller 34.

FIG. 1 also shows a electro hydraulic power steering pump 80 connected to the communication bus 50 and to the battery contactors 64, 66. The electro hydraulic power steering (EHPS) pump 80 provides or outputs fluid pressure to the steering gear 84, for assisting in movement of the front wheels 88.

FIG. 1 also shows a steering wheel 92 that provides force and/or position information to a steering wheel sensing device 96. The steering wheel sensing device 96 provides force and/or wheel position information to the vehicle electronic controller 34 that is utilized to control the steering gear 84.

The electro hydraulic power steering (EHPS) pump 80 provides or outputs fluid pressure to the steering gear 84, that results in more force or torque than an electric motor directly connected to the steering gear. Thus, the arrangement disclosed herein is especially useful for larger vehicles, such as Class 5 electric vehicles, Class 8 electric vehicles, electric trucks, and electric buses that require greater force in turning the front wheels 88 than other electric vehicles.

FIG. 1 shows the steering gear 84 connected with the front wheels 88 of the electric vehicle. The arrangement allows a vehicle user that is operating the steering wheel 92 to change a direction of the front wheels 88 with the assistance of the output of the electro hydraulic power steering pump 80. While FIG. 1 shows the front wheels 88 as the steered wheels, in other embodiments, additional or different wheels, such as rear wheels, can be the steered wheels.

Figure 2:
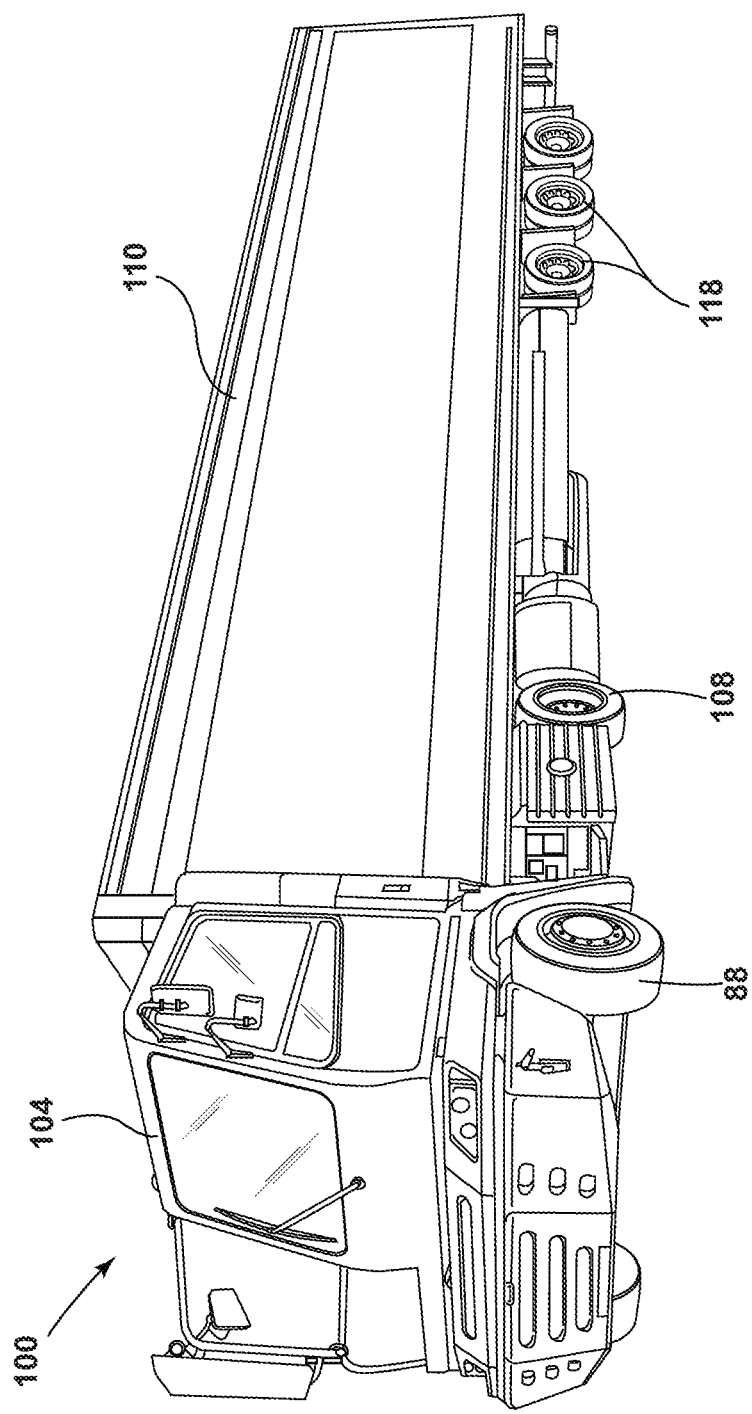
FIG. 2 illustrates a top view of an electric truck.

FIG. 2 shows an electric vehicle 100 that includes a HV electric vehicle battery. The electric vehicle 100 includes a tractor 104 having front wheels 88 and rear wheels 108. The electric vehicle 100 includes a trailer 110 having trailer wheels 118. The components illustrated in FIG. 1 and additional elements, including a traction control system, are provided in the electric vehicle 100 shown in FIG. 2.

In one embodiment, the electric vehicle 100 is a Class 5 or larger electric vehicle. A Class 5 vehicle has a gross vehicle weight of greater than 7257 kg to 8845 kg (16,001-19,500 lbs). In another embodiment, the electric vehicle is at or above 3½ metric tons capacity. In another embodiment, the electric vehicle 100 is a Class 8 electric vehicle. A Class 8 vehicle has a gross vehicle weight of greater than 14968 kg (33,001 lbs. and over). In one embodiment, the electric vehicle 100 is a bus. Other arrangements are contemplated, such as a cement mixer, or a dump truck having no trailer. Other heavy equipment vehicles are also contemplated. In conclusion, a vehicle user is capable of changing a direction of steered wheels of the electric vehicle, including a large electric truck 100.

Operation

In operation, the vehicle electronic controller 34 operates various devices to drive the electric vehicle 100. However, for purposes of discussion, the operation is limited to the electro hydraulic power steering system 30, and specifically operation of the electro hydraulic power steering pump 80.

Figure 3:
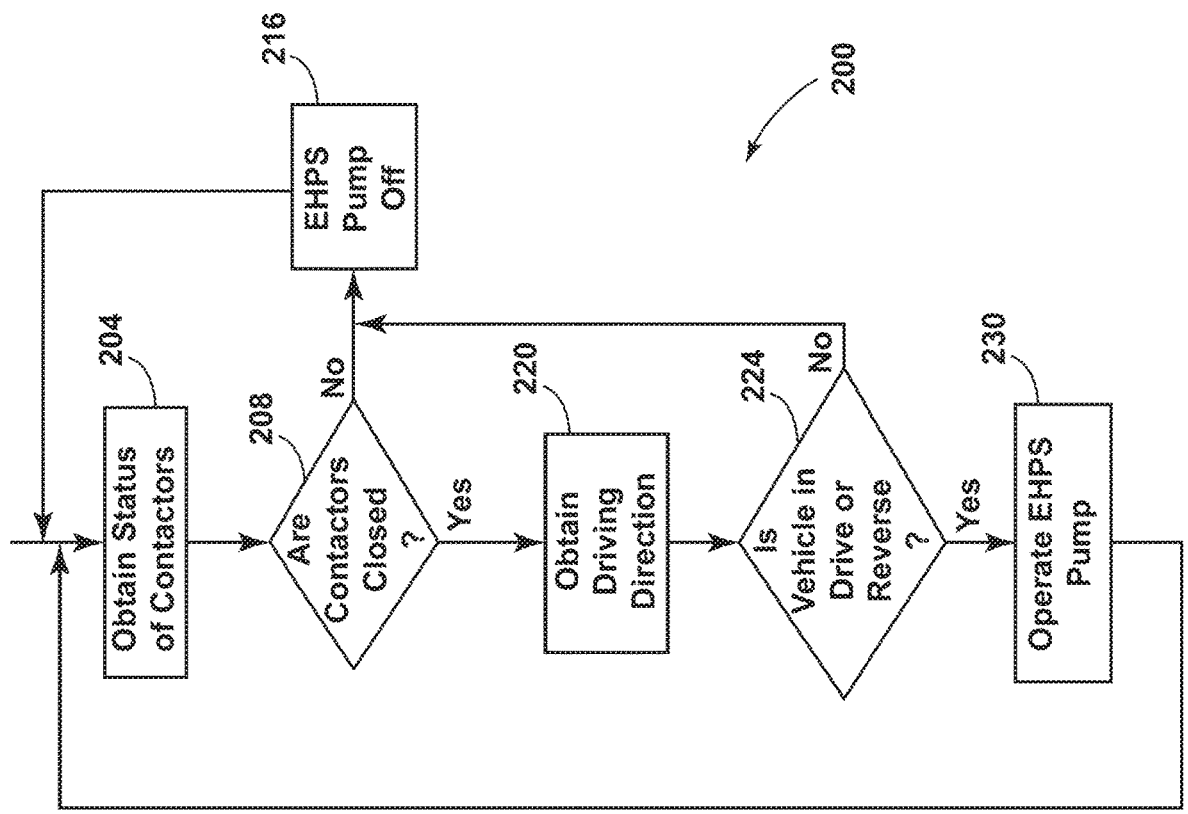
FIG. 3 illustrates a flowchart for operation of the arrangement shown in FIG. 1.

FIG. 3 shows a flow chart 200 of a method for controlling the operation of an electro hydraulic power steering system 30 shown in FIG. 1. While a single vehicle electronic controller 34 is shown in FIG. 1, multiple electronic controllers and/or electronic processors 40 can perform the various functions shown in FIG. 3, along with other control of the vehicle. The multiple steps shown in FIG. 3 can occur essentially simultaneously or in parallel with multiple electronic processors of the vehicle electronic controller 34. Further, the steps can be executed in a different order in additional embodiments.

At step 204 shown in FIG. 3, in one embodiment, a status of the battery contactors 64, 66 is obtained by the electronic processor 40 from the contactor controller 60 over the communication bus 50. The electronic processor 40 determines opening or closing condition of the battery contactors 64, 66. The electronic processor 40 advances to decision step 208.

At decision step 208, the electronic processor 40 determine whether the battery contactors 64, 66 are open or closed. When the battery contactors 64, 66 are open, the electronic processor 40 advances to step 216.

At step 216, the electronic processor 40 provides a deactivation signal or a pump off signal to the electro hydraulic power steering pump 80 via the communication bus 50. Thus, if the EHPS pump 80 previously was off, the pump remains off. If the EHPS pump 80 previously was on, the deactivation signal or pump off signal results in shutdown of the operation thereof. The electronic processor 40 returns to step 204 and repeats the process.

Returning to decision step 208, when the electronic processor 40 determines that the battery contactors 64, 66 are closed or in a close condition, the electronic processor 40 advances to step 220.

At step 220, the driving direction indicator 78 provides a driving signal to the electronic processor over the communication bus 50. The driving signals include D, R, N and P as discussed above. The electronic processor 40 advances to decision step 224.

At decision step 224, the electronic processor 40 determines whether the electric vehicle is in drive or reverse. If not (in park or neutral), the decision step advances to step 216 wherein the EHPS pump 80 is shut down by the electronic processor 40 sending a deactivation signal or a pump off signal to the electro hydraulic power steering pump via the communication bus 50. When the EHPS pump 80 is already off, the pump simply remains off. Then the electronic processor 40 returns to step 204 and repeats the process.

At decision step 224, when the electronic processor 40 determines the electric vehicle is in drive or reverse, the electronic processor 40 advances to step 230. At step 230, the electronic processor 40 provides an activation signal or a pump on signal to the electro hydraulic power steering pump 80 via the communication bus 50. Thereafter, the electronic processor returns to step 204.

Thus, in operation, the electro hydraulic power steering pump 80 will remain activated so long as the battery contactors 64, 66 remain closed and the electric vehicle 100 is in drive or reverse by sequencing through steps 204, 208, 220, 224, 230. When either condition fails, the electronic processor advances to step 216 and turns the EHPS pump 80 off with a deactivation signal provided over the communication bus 50.

In the above arrangement, the electro hydraulic power steering pump 80 is free from activation or deactivation by a steering wheel sensing device as the pump is only driven in dependence upon the state of the battery contactors 64, 66 and the drive or reverse driving signal for the electric vehicle 100. Further, the front wheels 88 for steering the electric vehicle 100 are turnable before the electric vehicle moves.

Second Embodiment

Figure 4:
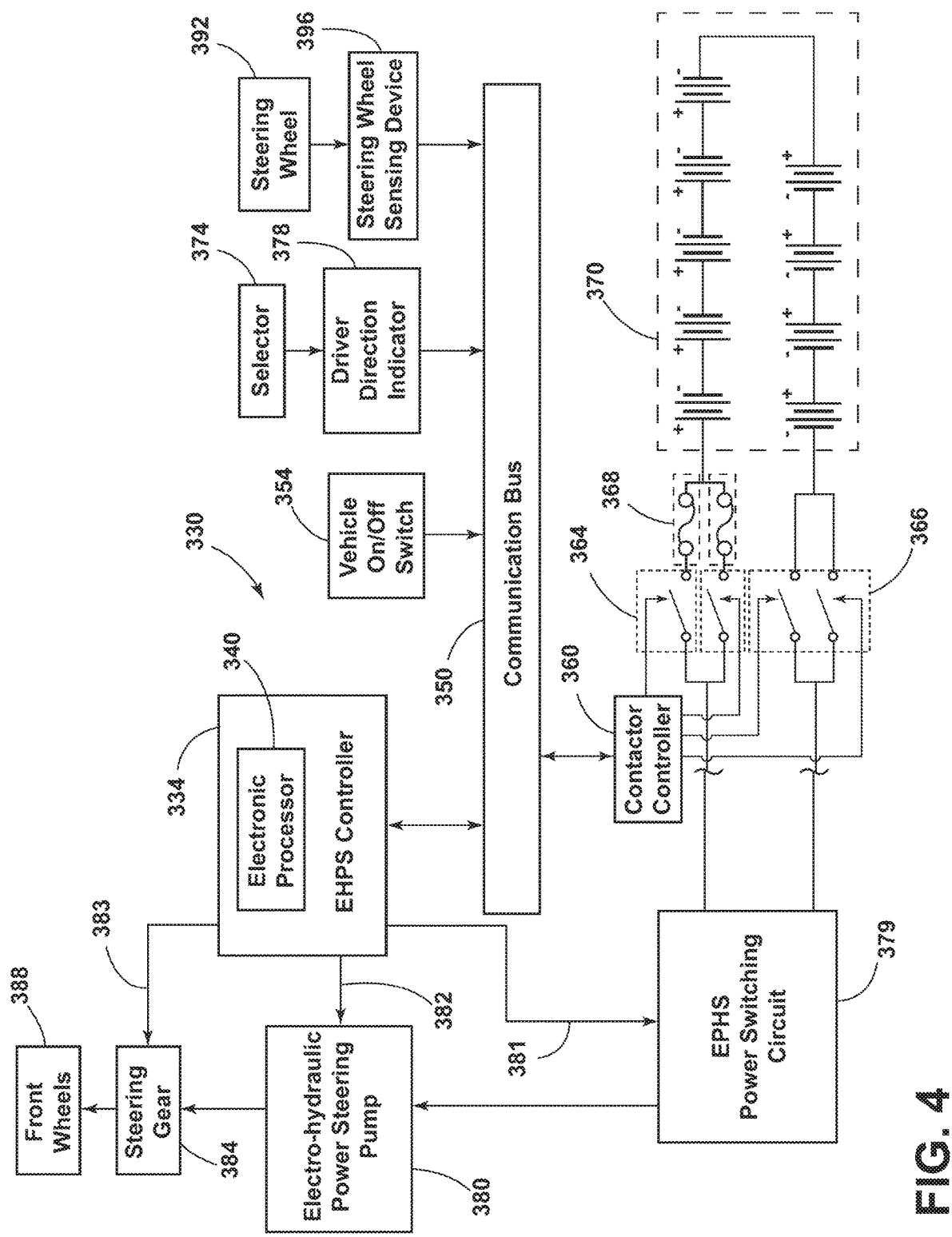
FIG. 4 illustrates a block diagram of another embodiment of an electro hydraulic power steering system for an electric vehicle.

FIG. 4 shows a block diagram view of a second embodiment of an electro hydraulic power steering system 330 for controlling operation of an electro hydraulic power steering pump of an electric vehicle. In one embodiment, the electro hydraulic power steering system 330 includes an electro hydraulic power steering (EHPS) electronic controller 334. The EHPS electronic controller 334 includes an electronic processor 340 and a memory (not shown). The memory includes one or more memory modules, such as a random access memory ("RAM") and/or an electronically erasable programmable read-only memory ("EEPROM"). An input/output interface transmits and receives information over a communication bus 350. The electronic processor 340 processes the information by executing one or more applications or modules. The applications or modules can be stored as instructions or commands in the memory. In some embodiments, the electronic processor 340 also stores information in the memory generated by applications.

The communication bus 350 shown in FIG. 1 provides a communication link between a plurality of controllers, sensors, and other devices. In the FIG. 4 embodiment, the communication bus 350 connects a vehicle on/off switch 354 that provides a start signal to a contactor controller 360 having battery contactors 364, 366 and fuses 368. The battery contactors 364, 366 and the fuses 368 connect with a high voltage (HV) electric vehicle battery 370 for driving the electric vehicle 100.

FIG. 4 shows a driving selector 374 for selecting drive (D), reverse (R), neutral (N) or park (P) for the electric vehicle 100. The driving selector 374 can be provided by a lever, inputs to a touchscreen, a selector with a push button to allow movement to different positions thereof, or other selector input arrangements. The driving selector 374 interacts with a driving direction indicator 378 that provides the particular selected (D, R, N, P) signal onto the communication bus 350. The communication bus 350 provides the selected signal to the EHPS electronic controller 334. In one embodiment, the EHPS electronic controller 334 represents a type of vehicle electronic controller.

FIG. 4 also shows an electro hydraulic power steering (EHPS) switching circuit 379. The EHPS switching circuit 379 provides a high voltage from the HV electric vehicle battery 370 to an electro hydraulic power steering pump 380. A pulse width modulation (PWM) digital or analog signal line 381 provides an activation signal from the EHPS electronic controller 334 to the EHPS switching circuit 379. Likewise, the digital or analog signal line 381 can provide a deactivation signal from the EHPS electronic controller 334 to the EHPS switching circuit 379.

In some embodiments, the EHPS electronic controller 334 provides an activation signal over a PWM digital or analog signal line 382 to operate the electro hydraulic power steering pump 380, when the battery contactors 364, 366 are closed and the driving direction signal is drive or reverse. Further, information from the electro hydraulic power steering pump 380 is provided to the EHPS electronic controller 334 in some embodiments over the signal line 382.

The electro hydraulic power steering pump 380 provides or outputs fluid pressure to a steering gear 384, which provides more force or torque than an electric motor alone. Force applied by a vehicle user to a steering wheel is magnified by the assistance of the electro hydraulic power steering pump 380 providing fluid pressure to the steering gear 384. Thus, the arrangement disclosed herein is especially useful for larger vehicles.

More specifically, in one embodiment, inputs from a steering wheel sensing device (not shown) are provided over the communication bus 350 to the EHPS electronic controller 334. The inputs are processed by the EHPS electronic controller 334 and provided over a PWM digital or analog signal line 383 to the steering gear 384. FIG. 4 shows the steering gear 384 connected with the front wheels 388 of the electric vehicle 100. PWM digital or analog signal lines 381, 382, 383 are dedicated data/control signal lines. Other embodiments that include signals without pulse width modulation are also contemplated.

FIG. 4 also shows a steering wheel 392 that provides force and/or position information to a steering wheel sensing device 396. The steering wheel sensing device 396 provides force and/or wheel position information to the EHPS electronic controller 334 that is utilized to control the steering gear 484.

Operation

In operation, the electro hydraulic power steering electronic controller 334 is directed to controlling only the electro hydraulic power steering system 330. In other embodiments, the electro hydraulic power steering electronic controller 334 is part of a controller that operates various devices to drive the electric vehicle 100.

Figure 5:
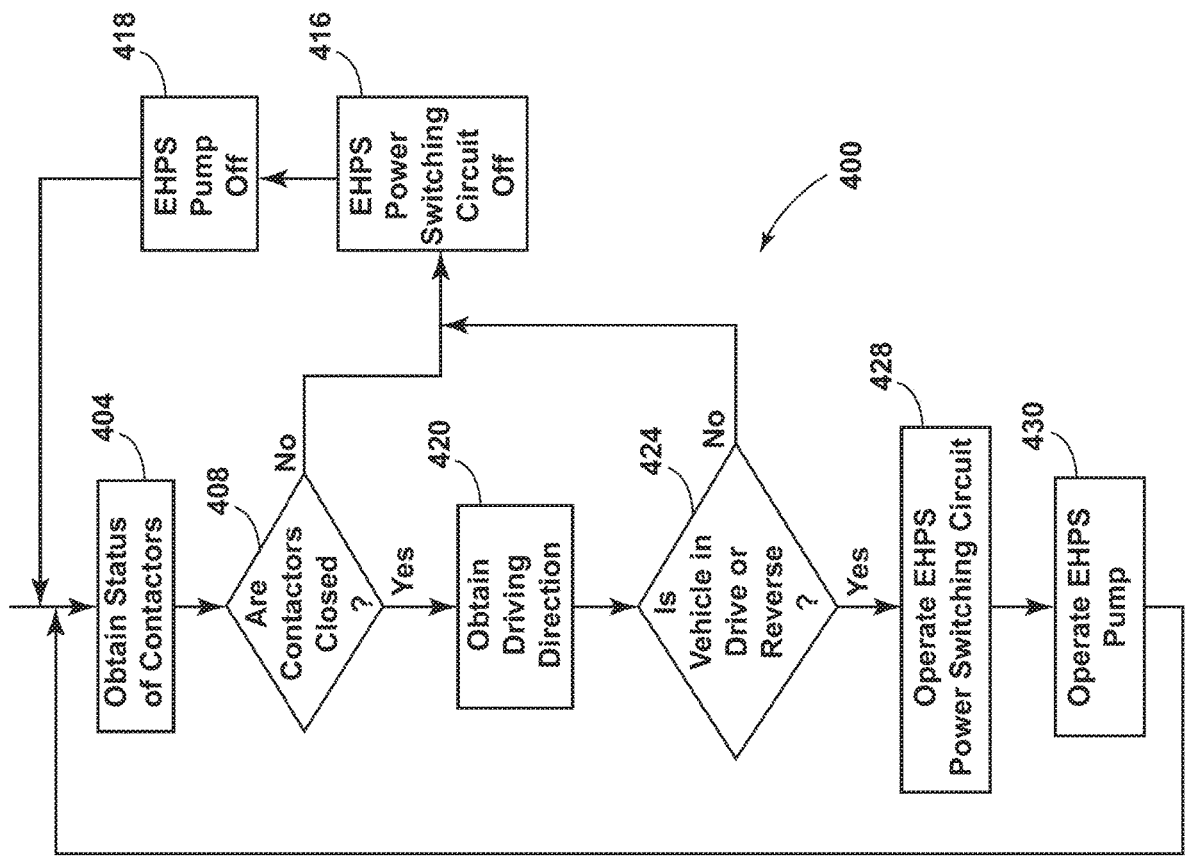
FIG. 5 illustrates a flowchart for operation of the arrangement shown in FIG. 4.

FIG. 5 shows a flow chart 400 of the operation of electro hydraulic power steering system 330 shown in FIG. 4. While a single EHPS electronic controller 334 is shown in FIG. 4, multiple electronic controllers and/or electronic processors 340 can perform the various functions shown in FIG. 5. The multiple steps shown in FIG. 5 can occur essentially simultaneously or in parallel with multiple electronic processors of the EHPS electronic controller 334.

At step 404, in one embodiment, a status of the battery contactors 364, 366 is obtained by the electronic processor 340 from the contactor controller 360 over the communication bus 350. The electronic processor 340 advances to decision step 408.

At decision step 408, the electronic processor 340 determine whether the battery contactors 364, 366 are open or closed. When the battery contactors 364, 366 are open, the electronic processor 340 advances to step 416.

At step 416, the electronic processor 340 provides a switching circuit off signal or deactivation signal to the EHPS switching circuit 379. In this embodiment, the switching circuit off signal is provided from the EHPS electronic controller 334 as a pulse width modulation (PWM) digital or analog signal over the signal line 381 to the EHPS switching circuit 379. Other electrical connections and electric control signals are contemplated. Thereafter, the electronic processor 340 advances to step 418.

At step 418, the electronic processor 340 provides a deactivation signal or a pump off signal to the electro hydraulic power steering pump 380 via the signal line 382. The deactivation signal can be a pulse width modulation (PWM) digital or analog signal. In some embodiments, there is no connection from the electronic processor 340 to the EHPS pump 380 as the pump will not operate without power supplied thereto. However, the electronic processor 340 can receive signals from the EHPS pump 380 as to the operating status thereof in some embodiments. If the EHPS pump 380 previously was operating, the deactivation signal results in shutdown of the operation thereof. The electronic processor 340 then returns to step 404 and repeats the process.

Returning to decision step 408, when the electronic processor 340 determines that the HV battery contactors 364, 366 are closed, the electronic processor 340 advances to step 420.

At step 420, the driving direction indicator 378 provides a driving signal to the electronic processor 340 over the communication bus 350. The driving signals include D, R, N and P as discussed above. The electronic processor 340 advances to decision step 424.

At decision step 424, the electronic processor 340 determines whether the electric vehicle 100 is in drive or reverse. If not (in park or neutral), the decision step 424 advances to step 416 wherein the EHPS switching circuit 379 is disconnected by another deactivation signal provided on the signal line 381, if not already disconnected from supplying power from the electric vehicle battery 370 to the EHPS pump 380. Thereafter, the electronic processor 340 advances to step 418, whereat the EHPS pump 380 is shut down by the electronic processor 340 sending a deactivation signal or a pump off signal to the electro hydraulic power steering pump 380 on signal line 382 in some embodiments. Then the electronic processor 340 returns to step 404 and repeats the process.

At decision step 424, when the electronic processor 340 determines the electric vehicle is in drive or reverse (one of drive and reverse) from the driving signal from the driving direction indicator 378, the electronic processor 340 advances to step 428. At step 428, the electronic processor 340 provides a power on or activation signal to the EHPS switching circuit 379 to provide power to the EHPS pump 380 on the signal line 382. In one embodiment, the activation signal is a PWM signal. Thereafter, the electronic processor advances to step 430.

At step 430, in some embodiments the electronic processor 340 provides another activation signal or pump on signal to the electro hydraulic power steering pump 380 via a dedicated connection or another signal line. The another activation signal can be a pulse width modulation (PWM) digital or analog signal. Thereafter, the electronic processor 340 returns to step 404.

Thus, in operation, the electro hydraulic power steering pump 380 will remain activated so long as the battery contactors 364, 366 remain closed and the electric vehicle 100 is in drive or reverse by sequencing through steps 404, 408, 420, 424, 428, 430. When either required condition fails, the electronic processor 340 advances to steps 416, 418 and provides deactivation signals to the EHPS switching circuit 379, and to the EHPS pump 380. The deactivation signals deactivate the providing of power to the EHPS pump 380 and the operation of the EHPS pump 380.

In the above arrangement, the electro hydraulic power steering pump 380 is free from activation or deactivation by a steering wheel force sensing device. In some embodiments, the electric vehicle is free from an internal combustion engine, and thus is an all-electric vehicle.

Although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices or electronic processors 40 connected by one or more networks or other suitable communication means.

Various features, advantages, and embodiments are set forth in the following claims.

What is claimed is:

1. An electro hydraulic power steering system for an electric vehicle having an electric vehicle battery, the electro hydraulic power steering system comprising:
   an electro hydraulic power steering pump for assisting in movement of a steering wheel; and
   a communication bus connected to a vehicle electronic controller, the vehicle electronic controller including an electronic processor and a memory, wherein the electronic processor is configured to:
   receive a closed or open position for battery contactors from a contactor controller over the communication bus,
   receive a driving direction signal for the electric vehicle from a driving direction indicator over the communication bus,
   determine when the battery contactors are closed and when the driving direction signal is drive or reverse for the electric vehicle,
   provide an activation signal to operate the electro hydraulic power steering pump when the battery contactors are closed and the driving direction signal is for one of drive and reverse, wherein a vehicle user is capable of changing a direction of steered wheels of the electric vehicle,
   determine when the electric vehicle is not in drive or reverse,
   determine whether the battery contactors are open, and provide a deactivation signal to the electro hydraulic power steering pump when the electric vehicle is not in either of drive and reverse, and/or when the battery contactors are open.

2. The electro hydraulic power steering system according to claim 1, wherein the electronic processor provides the activation signal over the communication bus to operate the electro hydraulic power steering pump, when the battery contactors are closed and the driving direction signal is in drive or reverse.

3. The electro hydraulic power steering system according to claim 1, wherein the electronic processor provides the activation signal over a PWM digital or analog signal line to operate the electro hydraulic power steering pump, when the battery contactors are closed and the driving direction signal is drive or reverse, and
wherein the vehicle electronic controller is an electro hydraulic power steering electronic controller.

4. The electro hydraulic power steering system according to claim 3, wherein the electronic processor provides another activation signal over another PWM digital or analog signal line to operate an electro hydraulic power steering switching circuit to provide a high voltage to the electro hydraulic power steering pump from the electric vehicle battery.

5. The electro hydraulic power steering system according to claim 1, wherein the electric vehicle includes a vehicle on/off switch to provide a start signal to the contactor controller over the communication bus to close the battery contactors and provide power to the electro hydraulic power steering pump.

6. The electro hydraulic power steering system according to claim 1, wherein the driving direction indicator determines shifting to one of park, neutral, drive, and reverse.

7. The electro hydraulic power steering system according to claim 1, wherein the electro hydraulic power steering pump is free from activation or deactivation by a steering wheel sensing device.

8. The electro hydraulic power steering system according to claim 1, wherein the steered wheels for steering the electric vehicle are turnable before the electric vehicle moves.

9. A method for controlling an electro hydraulic power steering pump of an electro hydraulic power steering system of an electric vehicle including an electronic processor, the method comprising
determining closing of battery contactors;
providing a driving direction signal with a driving direction indicator indicating when the electric vehicle is in drive or reverse;
activating the electro hydraulic power steering pump of the electro hydraulic power steering system whereby a vehicle user is capable of changing a direction of steered wheels of the electric vehicle when the battery contactors are closed and the electric vehicle is in drive or reverse;
determining when the electric vehicle is not in one of drive and reverse, or that the battery contactors are open with the electronic processor; and
deactivating the electro hydraulic power steering pump of the electro hydraulic power steering system when the electric vehicle is not in either of reverse or drive, and/or when the battery contactors are open.

10. The method according to claim 9, including activating the electro hydraulic power steering pump by providing an activation signal to the electro hydraulic power steering pump via a communication bus, and deactivating the electro hydraulic power steering pump by providing a deactivation signal to the electro hydraulic power steering pump via the communication bus.

11. The method according to claim 9, including activating the electro hydraulic power steering pump by providing an activation signal over a PWM digital or analog signal line when the battery contactors are closed and the driving direction signal is drive or reverse.

12. The method according to claim 11, including activating an electro hydraulic power steering switching circuit with another PWM digital or analog signal line to provide a high voltage to the electro hydraulic power steering pump from an electric vehicle battery when the battery contactors are closed and the driving direction signal is drive or reverse.

13. The method according to claim 9, including providing a start signal to a contactor controller over a communication bus from a vehicle on/off switch to close the battery contactors and provide power to the electro hydraulic power steering pump.

14. The method according to claim 9, wherein the driving direction indicator determines shifting to one of park, neutral, drive, and reverse.

15. The method according to claim 9, wherein the electro hydraulic power steering pump is free from activation or deactivation by a steering wheel sensing device, and wherein the steered wheels for steering the electric vehicle are turnable before the electric vehicle moves.

16. An electric vehicle comprising:
an electric vehicle battery;
an electro hydraulic power steering pump for assisting in movement of a steering wheel;
battery contactors provided between the electric vehicle battery and the electro hydraulic power steering pump;
a driving direction indicator for providing signals for a shift position of a driving selector;
a communication bus connected to a vehicle electronic controller, the vehicle electronic controller including an electronic processor and a memory, wherein the electronic processor is configured to:
receive a closed or open position for the battery contactors from a contactor controller over the communication bus;
receive a driving direction signal for the electric vehicle from the driving direction indicator over the communication bus;
determine when the battery contactors are closed and when the driving direction signal is drive or reverse for the electric vehicle;
provide an activation signal to operate the electro hydraulic power steering pump when the battery contactors are closed and the driving direction signal is for one of drive and reverse, wherein a vehicle user is capable of changing a direction of steered wheels of the electric vehicle;
determine when the electric vehicle is not in drive or reverse;
determine whether the battery contactors are open; and
provide a deactivation signal to the electro hydraulic power steering pump when the electric vehicle is not in either of drive and reverse, and/or when the battery contactors are open.

17. The electric vehicle according to claim 16, wherein the electric vehicle is a Class 5 or larger electric vehicle.

18. The electric vehicle according to claim 16, wherein the electric vehicle is at or above 3½ metric tons capacity.

19. The electric vehicle according to claim 16, wherein the electric vehicle is a Class 8 electric vehicle.

20. The electric vehicle according to claim 16, wherein the electric vehicle is an electric bus, and wherein the vehicle electronic controller is an electro hydraulic power steering electronic controller.

\* \* \* \* \*